H. N. EGGLESTON.

Improvement in Car-Springs.

No. 127,160. Patented May 28, 1872.

Witnesses.
D. P. Howl
Edmund Masson

Inventor.
Horatio N. Eggleston,
By atty A. V. Stoughton.

127,160

UNITED STATES PATENT OFFICE.

HORATIO N. EGGLESTON, OF SEYMOUR, CONNECTICUT, ASSIGNOR TO HIMSELF AND CARLOS FRENCH, OF SAME PLACE.

IMPROVEMENT IN CAR-SPRINGS.

Specification forming part of Letters Patent No. 127,160, dated May 28, 1872.

*To all whom it may concern:*

Be it known that I, HORATIO N. EGGLESTON, of Seymour, in the county of New Haven and State of Connecticut, have invented certain new and useful Improvements in Car-Springs; and I do hereby declare the following to be a full, clear, and exact description of the same, reference being had to the accompanying drawing making a part of this specification, in which—

Figure 1:
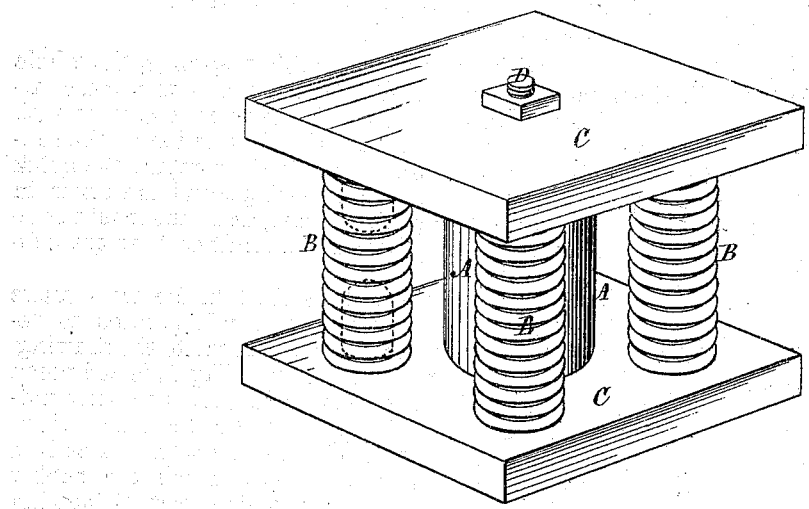
Figure 2:
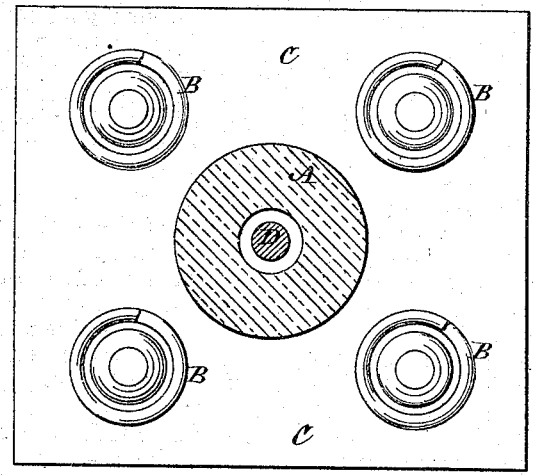

Figure 1 represents in perspective one of the springs in question. Fig. 2 represents a horizontal section through the same.

Similar letters of reference, where they occur in the separate figures, denote like parts of the spring in the drawing.

Springs have heretofore been made of steel and rubber combined, but the steel has been coiled around the outside or inside of the rubber, or both, so that the elasticity of one of the substances is impaired by that of the other, there being a material difference in the sensibility of their action. Rubber springs as now used are liable to burst when overloaded, or subjected to a sudden strain or heavy blow. They are, moreover, much more slow in their action than those made of steel; but when steel springs are used alone, they are liable to break by any sudden weight or blow coming upon them, because of the quickness with which they act and react. When rubber and steel springs are combined so that one kind shall not interfere with the action of the other kind, the difficulties attending the springs separately is obviated, and their particular properties made available for relieving each other. The rubber being slow in its action receives the blow or strain at the same time that the steel springs do, but makes it much less sudden for the steel springs, and lessens their liability to break; and when the rubber has gradually transferred the weight to the steel springs, the latter in turn prevent the rupture of the rubber spring. Combining these two substances of rubber and steel, or other suitable metal, into one spring, the soft slow ac- action of the rubber and the quick action of the metal are made available to mutually aid each other, and make a much more easy motion than either the rubber or steel alone will make.

My invention consists in a spring made of one or more spiral springs of metal, combined with one or more rubber springs, the whole acting together to make one spring, and so arranged as not to vibrate in contact with each other, but so that the slow action of the rubber springs may be used to retard the quick action of the metal springs, and the latter, in turn, relieve the former, and thus insure safety to each from the casualties they are subject to.

To enable others skilled in the art to make and use my invention, I will proceed to describe the same with reference to the drawing.

The spring, as shown in Fig. 1, is composed of a central rubber spring, A, with surrounding metal spiral springs B B, &c., said springs being held and sustained between plates C C. In the drawing I have shown the rubber spring A as tubular, and a bolt, D, passing through it and through the plates to hold it in place, and the coiled or spiral springs, as retained by teats, (in dotted lines to the left of Fig. 1,) on the plates extending into said springs.

Other means of securing the series of springs in place may be used, and instead of separate plates the springs may be arranged upon a car by having the wood or iron of the car where they are to be placed, made with projections or depressions to hold the springs in place, and they may be just far enough apart so as not to touch or interfere with each other when vibrating.

I have also shown in the drawing the rubber spring in the center and the spiral springs arranged around it; but the spiral or spirals may be in the center, and the rubber springs grouped around outside of them, if so preferred. Any suitable number of either or both of the rubber and metal springs may be used, but the latter not coiled around the rubber or embedded in it.

Having thus fully described my invention, what I claim is—

A car-spring composed of one or more spiral metal springs and one or more rubber springs, arranged to act separately, but to mutually support each other, as and for the purpose described and represented.

HORATIO N. EGGLESTON.

Witnesses:
WM. S. KERSHAW,
T. H. CANFIELD.